United States Patent [19]

Chau

[11] Patent Number: 5,106,532

[45] Date of Patent: Apr. 21, 1992

[54] METHOD OF MAKING LANTHANUM CERIUM TERBIUM PHOSPHATE PHOSPHOR

[75] Inventor: Chung N. Chau, Sayre, Pa.

[73] Assignee: GTE Products Corporation, Stamford, Conn.

[21] Appl. No.: 522,612

[22] Filed: May 14, 1990

[51] Int. Cl.$^5$ .............................. C09K 11/81
[52] U.S. Cl. .............................. 252/301.4 P
[58] Field of Search .................. 252/301.4 P

[56] References Cited

U.S. PATENT DOCUMENTS

| 3,544,483 | 12/1970 | Lagos | 252/301.4 P |
| 4,127,415 | 11/1978 | Quackenbush et al. | 252/301.4 P |
| 4,423,349 | 12/1983 | Nakajima et al. | 313/487 |

FOREIGN PATENT DOCUMENTS

| 57-133182 | 8/1982 | Japan | 252/301.4 P |
| 59-179578 | 10/1984 | Japan | 252/301.4 P |

*Primary Examiner*—Jack Cooper
*Attorney, Agent, or Firm*—Elizabeth A. Levy

[57] ABSTRACT

A method of making a lanthanum cerium terbium phosphate phosphor involves the single-step reaction of lanthanum cerium terbium oxalate and boron phosphate.

13 Claims, No Drawings

METHOD OF MAKING LANTHANUM CERIUM TERBIUM PHOSPHATE PHOSPHOR

TECHNICAL FIELD

This invention relates to a process for making a lanthanum cerium terbium phosphate phosphor for use in fluorescent lamps.

BACKGROUND ART

U.S. Pat. No. 4,423,349 to Nakajima et al, discloses two methods of making this phosphor. In one method, carbonates of lanthanum, cerium and terbium are formed at 70° C., which are then reacted with phosphoric acid at 75° C. to form a lanthanum cerium terbium phosphate. The phosphate is then fired at 1150° C. for 75 minutes to form the phosphor.

In another method, a coprecipitate of lanthanum cerium terbium oxalate is formed at 80° C. and decomposed at 800° C. to form a single-phase, mixed valence state lanthanum cerium terbium oxide. Diammonium phosphate is added to the oxide, and the mixture is then decomposed at 700° C. to form a lanthanum cerium terbium phosphate. The phosphate is then crushed and fired at 1200° C. for 4 hours to form the phosphor. Boron oxide or ammonium borate as a fluxing agent may be added before the firing step to promote the reaction and improve brightness.

SUMMARY OF THE INVENTION

The prior art methods require either a multiple-step synthesis of rare earth compounds before the firing step, or a multiple-step firing. Such additional manufacturing steps are inefficient and costly. Furthermore, because of the volatility of the phosphate sources used, a great excess of the phosphate compound is required in the reaction between the rare earth compounds and the phosphate to form the phosphor.

The present invention obviates these disadvantages by providing a method of synthesizing the phosphor in a single step. This is accomplished by the use of boron phosphate as the phosphate source. The stability of boron phosphate at elevated temperatures allows it to be used in stoichiometric proportions without the excessive phosphate losses that occur when more volatile phosphate sources are used.

It is an object of the invention to provide a more efficient method of making lanthanum cerium terbium phosphate phosphor.

In accordance with the invention there is provided a method of making lanthanum cerium terbium phosphate phosphor comprising the steps of reacting lanthanum cerium terbium oxalate with boron phosphate at a suitable temperature to form a mixture comprising lanthanum cerium terbium phosphate phosphor and boron oxide, and separating the phosphor from the boron oxide.

BEST MODE FOR CARRYING OUT THE INVENTION

For a better understanding of the present invention, together with other and further objects, advantages and capabilities thereof, reference is made to the following disclosure and appended claims.

The method of the present invention is a single-step synthesis whereby a coprecipitated rare earth oxalate is reacted with boron phosphate ($BPO_4$) to form a rare earth phosphor.

The rare earth raw materials may be a lanthanum cerium terbium oxalate having the composition $(La_{1-x-y}Ce_xTb_y)_2(C_2O_4)_3$ where $X = 0.17$ to $0.45$ and preferably from $0.18$ to $0.44$; and $y = 0.1$ to $0.16$ and preferably $0.12$ to $0.14$. A preferred lanthanum cerium terbium oxalate has the composition $(La_{0.446}Ce_{0.424}Tb_{0.130})_2(C_2O_4)_3$. The oxalate may be prepared from the precipitation of a nitric acid solution containing lanthanum oxide, terbium oxide, cerium nitrate and oxalic acid.

Boron phosphate, while commercially available, may not be of sufficient purity to obtain the results desired in this invention. It has been found that boron phosphate of a sufficiently high purity may be prepared by heating a 1:1 mixture of boric acid ($H_3BO_3$) and diammonium phosphate ($(NH_4)_2HPO_4$) at 700° C. to 1000° C. for 2 hours.

The reaction between boron phosphate and the rare earth oxalate begins at about 750° C. to about 800° C. However, the desired ionic equilibrium between cerium and terbium ion pairs does not occur until a temperature of about 1150° C. to 1300° C. is reached. Similarly, growth of phosphor crystals does not begin at the initial reaction temperature but instead occurs in the preferred temperature range of 1150° C. to 1300° C.

Boron phosphate, although formed from the reaction of two low melting-point oxides, is an extremely stable compound with a melting point in excess of 1600° C. When boron phosphate is used as the phosphate source in the present invention, near stoichiometric proportions of the rare earth oxalate and boron phosphate can be used. For example, a preferred molar ratio of rare earth oxalate to boron phosphate is from about 1:1 to about 1:1.05. Because of its high melting point, boron phosphate does not evaporate or decompose before the preferred phosphor reaction temperature is reached.

Prior art phosphate sources such as diammonium phosphate decompose, melt or evaporate below 1150° C. Therefore, substantially excessive amounts of the phosphate source must be provided, and/or multiple firing steps must be employed to secure a sufficient amount of the phosphate for reaction with the rare earth oxalate to form the phosphor.

During the firing step as per this invention boron phosphate reacts with lanthanum cerium terbium oxalate to form a lanthanum cerium terbium phosphate phosphor in a boron oxide ($B_2O_3$) solution. Boron oxide acts as a mild fluxing medium to promote the reaction by facilitating crystal growth.

An advantage of using boron phosphate as the phosphate source in this reaction is its capacity as a reducing agent. Cerium and terbium are present in lanthanum cerium terbium oxalate as +4 valence ions. These +4 ions are reduced to the +3 valence state in the presence of boron phosphate. Prior art methods for making this phosphor require a reducing atmosphere to effect this valence state reduction. The reaction as per this invention can occur in an inert atmosphere because of the reducing properties of boron phosphate.

It is preferred that the reaction as per this invention occur in an inert atmosphere. The presence of hydrogen during the reaction leads to the formation of carbon deposits which decreases plaque brightness.

After firing, the phosphor is washed in basic and acidic solutions to remove any residual boron compound impurities.

The following non-limiting example is presented.

EXAMPLE 1

The following raw materials were combined in a ten-quart plastic V-blender: 27.4 grams of lanthanum cerium terbium oxalate having the composition $(La_{0.446}Ce_{0.424}Tb_{0.130})_2(C_2O_4)_3$, and 10.57 grams of boron phosphate, $BPO_4$. The molar ratios of the components were thus 1 mole of rare earth oxalate and 1 mole of boron phosphate. The raw materials were V-blended for 15 minutes and then blended for 15 minutes with an intensifying bar to form a uniform mixture. The mixture was then fired in an open crucible at 1200° C. for 3 hours in a 100% nitrogen atmosphere to form the phosphor. The reaction is indicated by the following equation:

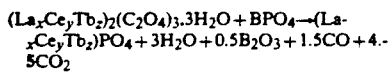

where
 x=0.39 to 0.73 and preferably 0.18 to 0.44;
 y=0.17 to 0.45 and preferably 0.18 to 0.44;
 z=0.10 to 0.16 and preferably 0.12 to 0.14.

The fired cake was broken up and washed at about 90° C. for about 4 hours in 2% dilute nitric acid, $HNO_3$. After filtration, the white body phosphor was washed and filtered three times with hot deionized water. The washed phosphor was then washed with 5% ammonium hydroxide, $NH_4OH$. After this base wash the phosphor was filtered and washed with hot deionized water. The filtered phosphor was dried at about 110° C. for about 16 hours and then sifted through a 378 nylon mesh screen.

While there has been shown and described what are at present considered the preferred embodiments of the invention, it will be obvious to those skilled in the art that various changes and modification may be made therein without departing from the scope of the invention as defined by the appended claims.

What is claimed is:

1. A method of making lanthanum cerium terbium phosphate phosphor, comprising the steps of:
   a) reacting lanthanum cerium terbium oxalate with boron phosphate at from about 1150° C. to about 1300° C. in an inert atmosphere absent hydrogen to form a mixture comprising lanthanum cerium terbium phosphate phosphor and boron oxide; and
   b) separating said lanthanum cerium terbium phosphate phosphor from said boron oxide.

2. The method of claim 1 wherein said lanthanum cerium terbium oxalate and said boron phosphate are provided in near stoichiometric proportions.

3. The method of claim 2 wherein said lanthanum cerium terbium oxalate and said boron phosphate are provided in a molar ratio of from about 1:1 to about 1:1.05.

4. The method of claim 1 wherein said lanthanum cerium terbium phosphate phosphor is formed according to the reaction:

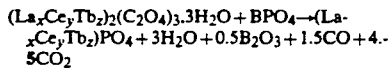

wherein
 x=0.39 to 0.73;
 y=0.17 to 0.45;
 z=0.10 to 0.16.

5. The method of claim 4 wherein x=0.42 to 0.70, y=0.18 to 0.44 and z=0.12 to 0.14.

6. The method of claim 4 wherein x=0.446, y=0.424 and z=0.130.

7. The method of claim 1 wherein said reaction step occurs in a nitrogen atmosphere.

8. The method of claim 1 wherein said reaction step occurs for about 1.5 to about 4 hours.

9. The method of claim 8 wherein said reaction step occurs at about 1200° C. for about 3 hours.

10. The method of claim 1 wherein said separation step is performed by washing.

11. The method of claim 10 wherein said washing step is performed in acidic and basic solutions.

12. The method of claim 11 wherein said acidic solution is dilute nitric acid.

13. The method of claim 11 wherein said basic solution is dilute ammonium hydroxide.

* * * * *